US007150485B2

(12) United States Patent
Wirges et al.

(10) Patent No.: US 7,150,485 B2
(45) Date of Patent: Dec. 19, 2006

(54) MOLD-INTEGRATED HEAT SHIELD

(75) Inventors: Todd Michael Wirges, Ann Arbor, MI (US); Brent Alan Schnabel, Fort Wayne, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 124 days.

(21) Appl. No.: 10/870,358

(22) Filed: Jun. 17, 2004

(65) Prior Publication Data

US 2005/0280273 A1 Dec. 22, 2005

(51) Int. Cl.
*B62D 33/00* (2006.01)

(52) U.S. Cl. .................................................... 296/39.3

(58) Field of Classification Search ................ 296/39.3
See application file for complete search history.

(56) References Cited

U.S. PATENT DOCUMENTS 5,108,817 A * 4/1992 Kidd et al. ................. 428/192
5,695,235 A * 12/1997 Martindale et al. ........ 296/39.2
6,302,466 B1 * 10/2001 Zwick ....................... 296/39.3
6,974,172 B1 * 12/2005 Gebreselassie et al. .... 296/39.3

OTHER PUBLICATIONS

Drawings of Strap-Type Heat Shield.

* cited by examiner

*Primary Examiner*—Joseph D. Pape
(74) *Attorney, Agent, or Firm*—Ronald W. Wangerow; Harness, Dickey & Pierce, P.L.C.

(57) ABSTRACT

An integrated automotive vehicle component and heat shield apparatus is provided. The apparatus includes a body having a heat sensitive region and a heat shield integrally molded thereon. The heat shield includes a first edge and a second edge. The first edge is bonded, via the molding process, to a first area of the body. The second edge is attached to a second area of the body. The second area is opposite the heat sensitive region from the first area. Thus, the heat shield covers the heat sensitive region of the body.

8 Claims, 4 Drawing Sheets

MOLD-INTEGRATED HEAT SHIELD

FIELD OF THE INVENTION

The present invention relates to automotive vehicle components and heat shields, and more particularly, to an automotive vehicle component having an integral heat shield.

BACKGROUND OF THE INVENTION

Various automotive vehicle components include temperature sensitive regions. These same components are often used in high temperature applications. Therefore, a heat shield is used to protect the heat sensitive region. One type of heat shield includes a strap-type heat shield. A strap-type heat shield attaches to the component in a manner similar to that of a belt. The strap is fed through at least one loop or flange portion on the automotive component and the ends are buckled or attached together. The strap-type heat shield has a primary shielding area, which is disposed over the heat sensitive region of the component. Problems associated with using a strap-type heat shield includes the additional cost of purchasing the heat shield, additional cost and complexity associated with manufacturing loops or flanges on the automotive component, and the extreme difficulty of assembly in mass production. As stated above, the strap-type heat shield is typically fed through at least one loop or flange formed on the automotive component. The loop or flange sometimes has less than 5 mm of clearance through curved, sharp and tacky rubber bonded surfaces. Therefore, manipulating the strap through these areas can be frustrating and time consuming.

SUMMARY OF THE INVENTION

The present invention provides an integrated automotive vehicle component and heat shield apparatus. The apparatus includes a body having a heat sensitive region and a heat shield integrally molded thereon. The heat shield includes a first edge and a second edge. The first edge is bonded, via the molding process, to a first area of the body. The second edge is attached to a second area of the body. The second area is opposite the heat sensitive region from the first area. Thus, the heat shield covers the heat sensitive region of the body.

Another aspect of the present invention includes a method of providing an integrated automotive vehicle component and heat shield apparatus. The method first includes selecting a component body. Next, a first edge of the heat shield is molded onto a first area of the component body. The heat shield is then folded about the first edge such that a second edge becomes juxtaposed with a second area of the component body. Finally, the second edge is attached to the second area of the component body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
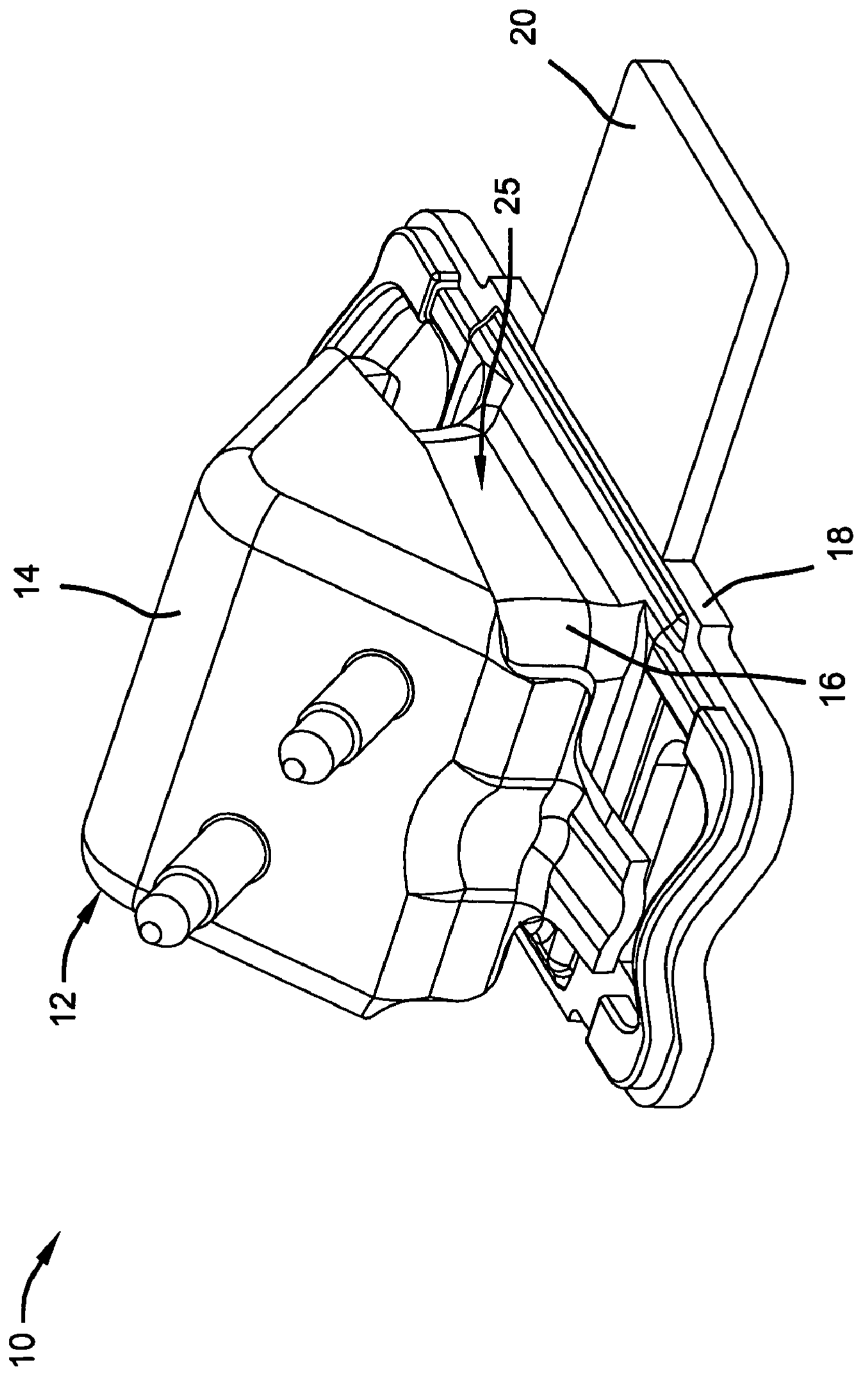
FIG. 1 is an isometric view of an exemplary integrated automotive vehicle component and heat shield apparatus in accordance with the principles of the present invention.
Figure 2:
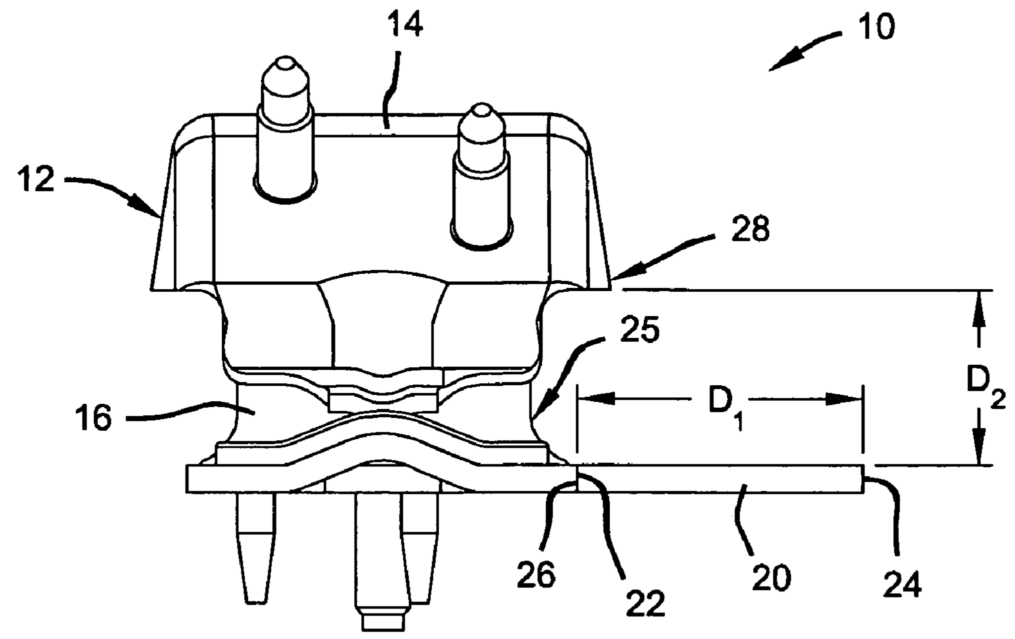
FIG. 2 is a front view of the integrated automotive vehicle component and heat shield apparatus of FIG. 1 as removed from the mold.

With reference to FIGS. 1 and 2, an integrated automotive vehicle component and heat shield apparatus 10 is described. The apparatus 10 includes an automotive component body 12 having a body cap 14, a pedestal 16, a base plate 18, and a heat shield 20. In the embodiment illustrated, the automotive component is a powertrain mount. It should be appreciated, however, that any mechanical component requiring a heat shield is intended to be within the scope of the present invention. The base plate 18 supports the pedestal 16, which supports the base cap 14. The heat shield 20 includes a first edge 22 and a second edge 24. The first-edge 22 is integrally bonded to a first area 26 of the base plate 18 such that the heat shield 20 naturally appends from the base plate 28. The pedestal 16 includes a heat sensitive region 25. The body cap 14 and base plate 18 are molded of steel and the pedestal 16 and heat shield 20 are molded of rubber.

Figure 3:
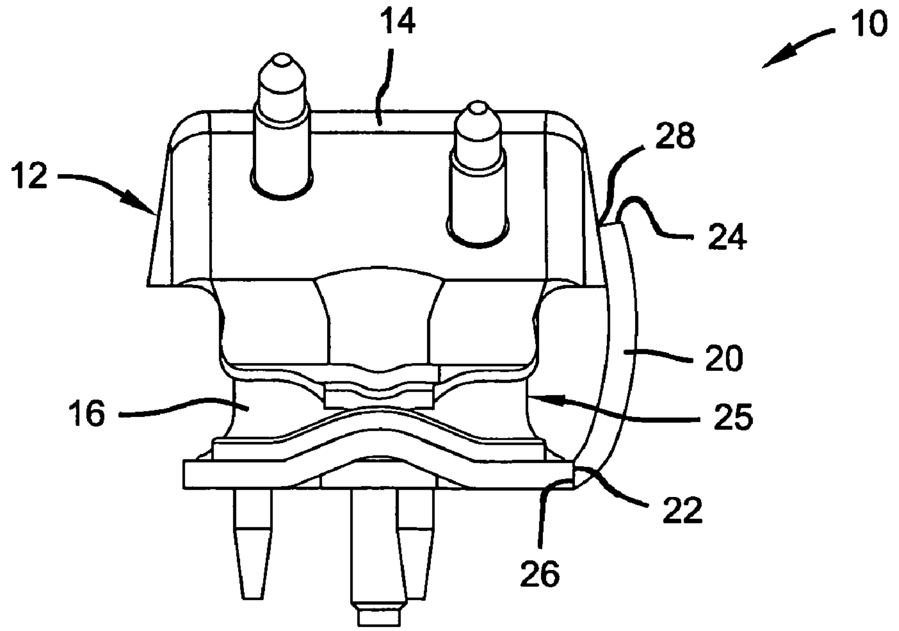
FIG. 3 is a front view of the integrated automotive vehicle component and heat shield apparatus of FIGS. 1 and 2 with the second edge of the heat shield attached to the component body.

Referring to FIG. 3, the second edge 24 of the heat shield 20 is attached to a second area 28 of the body cap 14. In the embodiment illustrated, the second edge 24 is attached to the second area 28 with an adhesive. In an alternative exemplary embodiment, the second edge 24 is attached to the second area 28 with an interference fit. It is envisioned that the interference fit may include a tongue formed on the heat shield 20 and received in an aperture formed in the second area 28 of the body cap 14. It is further envisioned that the interference fit may include a tongue formed on the second area 28 of the body cap 14 and received in an aperture molded into the second edge 24 of the heat shield 20. It is also envisioned that the engagement between the second edge 24 and the second area 28 is more robust than the bonding between the first edge 22 and the first area 26 of the base plate 18. This ensures that the heat shield 20 will continue to cover the heat sensitive region 25 of the pedestal 16 even in the event that the first edge 22 becomes debonded from the first area 26.

With further reference to FIGS. 2 and 3, the heat shield 20 has a dimension $D_1$ that is greater than a dimension $D_2$ between the first area 26 of the body 12 and the second area 28 of the body 12. This provides for a heat shield 20 having an arch-shaped front elevation upon attachment of the second edge 24. Such arch-shaped front elevation reduces tension at the interfaces between the first and second edges 22, 24 and the first and second areas 26, 28, respectively.

Figure 4:
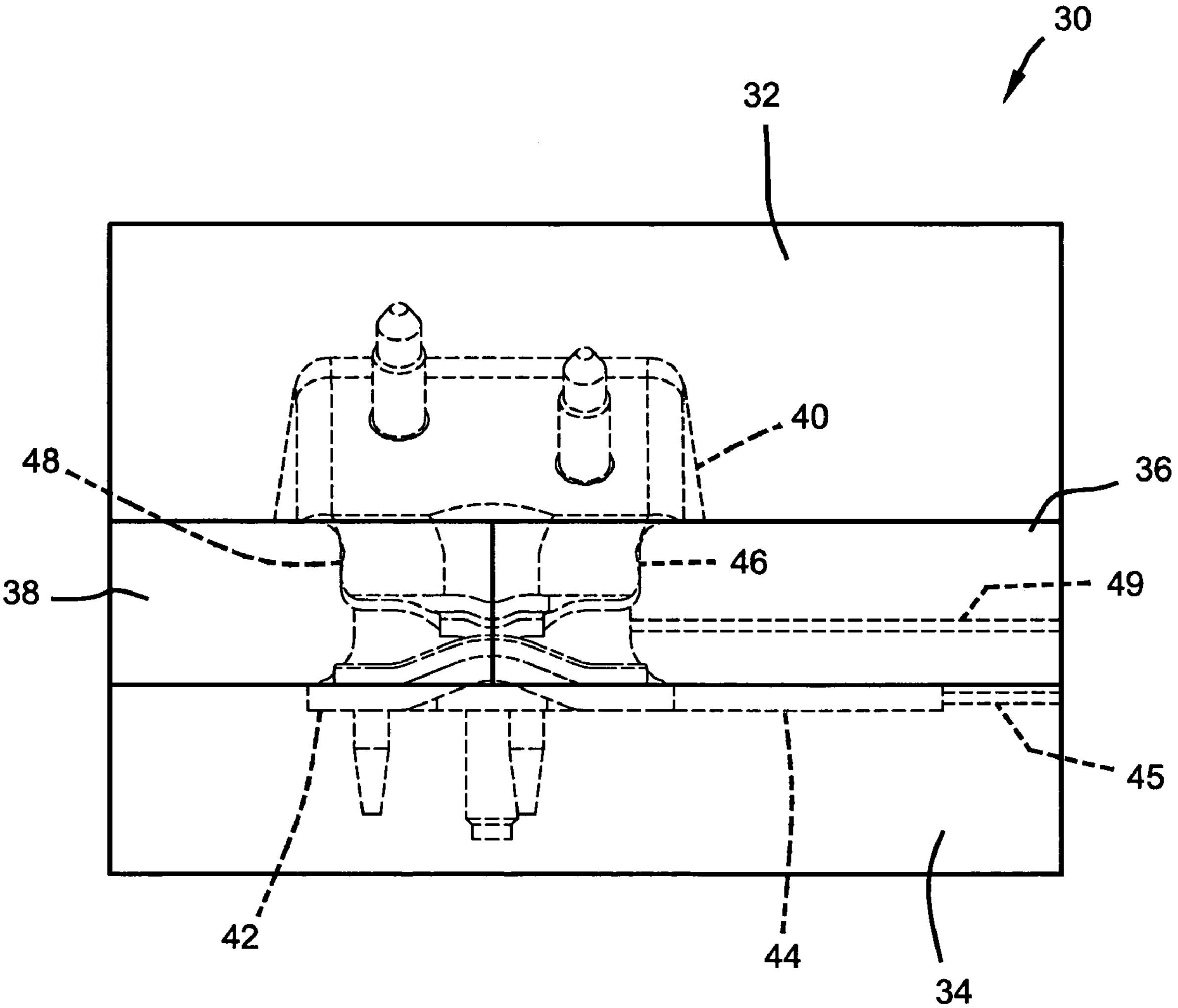
FIG. 4 is a front view of an exemplary mold assembly used to fashion the integrated automotive vehicle component and heat shield apparatus of FIGS. 1–3.

With reference to FIG. 4, a mold assembly 30 for integrally forming a heat shield 20 onto an automotive vehicle component in accordance with the present invention is described. The mold assembly 30 includes a top mold member 32, a bottom mold member 34, a first intermediate mold member 36, and a second intermediate mold member 38. The top mold member 32 includes a body cap cavity 40 adapted to receive the preformed body cap 14 of the body 12. The bottom mold member 34 includes a base plate cavity 42, a heat shield cavity 44, and a first feed bore 45. The base plate cavity 42 is adapted to receive the preformed base plate 18 of the body 12. The heat shield cavity 44 is adapted to define the geometry of the integrated heat shield 20 upon injection with a liquid rubber. The first and second intermediate mold members 36, 38 include cooperative first and second pedestal cavities 46, 48 for defining the pedestal 16 of the body 12 upon injection with a molten rubber. The first intermediate mold member 36 further includes a second feed bore 49. This configuration of split mold members enables the heat shield 20 to be integrally molded onto the body 12 of the automotive component in accordance with the present invention. It should be appreciated, however, that the above-described mold assembly 30 is merely exemplary, and that other mold assemblies capable of producing the same result are intended to be within the scope of the present invention.

Figure 5:
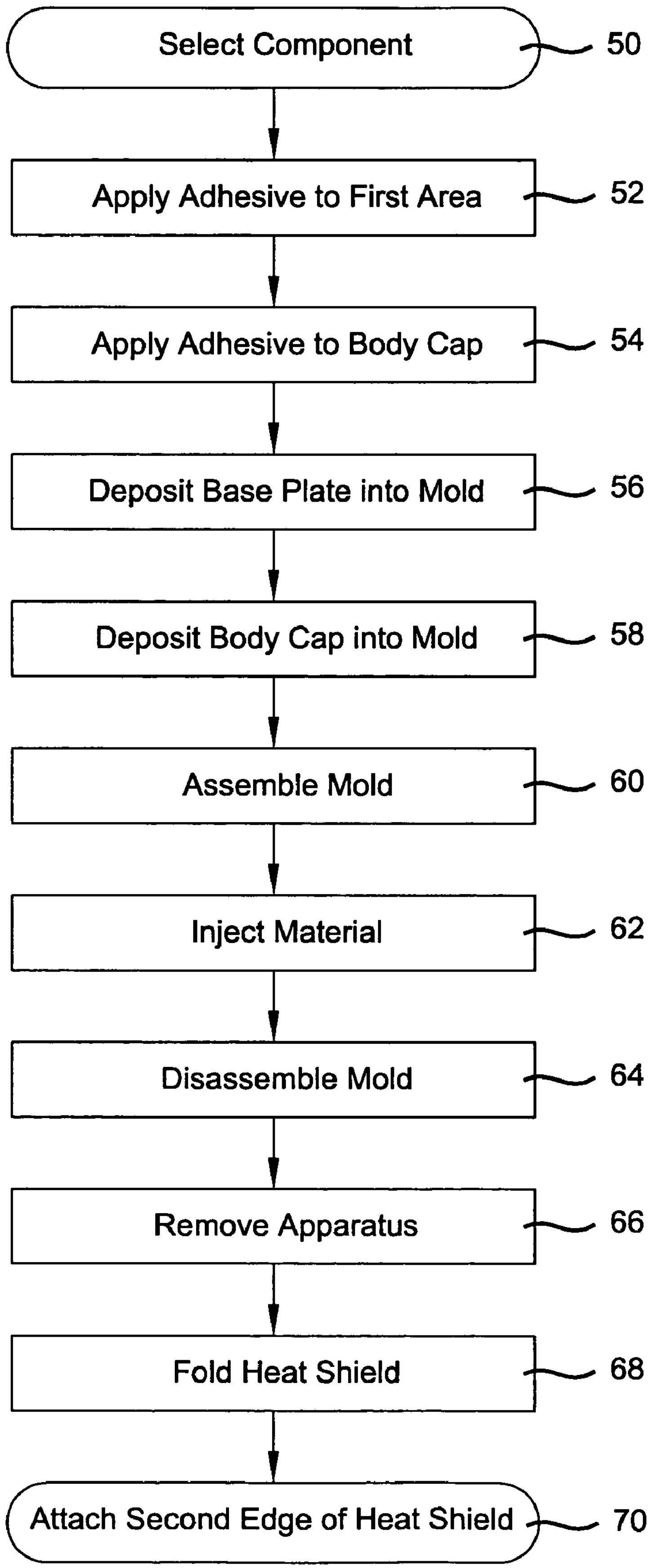
FIG. 5 is a flowchart of a method of providing an integrated automotive vehicle component and heat shield apparatus in accordance with the present invention.

FIG. 5 is a flowchart illustrating a method of providing an integrated automotive vehicle component and heat shield apparatus 10 in accordance with the present invention. Initially, a component body 12 is selected 50, which, in an exemplary embodiment includes a powertrain mount having a body cap 14 and a base plate 18. Next, adhesive is applied 52 to the first area 26 and a pedestal support area (not shown) of the base plate 18. Further, adhesive is applied 54 to an underside area (not shown) of the body cap 14. The base plate 18 is then deposited 56 into the base plate cavity 42 in the bottom member 34 and the body cap 14 is deposited 58 into the body cap cavity 40 in the top member 32. The top, bottom and intermediate members 32, 34, 36, and 38 of the mold assembly 30 are then assembled 60 into the configuration illustrated in FIG. 4. Molten rubber is injected 62 through the first and second feed bores 45, 49 to fill the heat shield and cooperating pedestal cavities 44 and 46, 48. This creates the pedestal 16 having the heat sensitive region 25. In an exemplary embodiment, the steps of filling the pedestal cavities 46, 48 and the heat shield cavity 44 occur substantially contemporaneously.

Subsequent to the pedestal 16 and heat shield 20 curing, the mold members 32, 34, 36, and 38 are disassembled 64 and the integrated automotive vehicle component and heat shield apparatus 10 is removed 66. The second edge 24 of the heat shield 20 is then folded 68 about the first edge 22 of the heat shield 20 and attached 70 to the second area 28 of the body cap 14. In an exemplary embodiment, the second edge 24 is attached by applying an adhesive to either the second edge 24, the second area 28, or both. In an alternative exemplary embodiment, the second edge 24 is attached by inserting a tongue formed on the second edge 24 into an aperture formed in the second area 28. In yet another alternative exemplary embodiment, the second edge 24 is attached by inserting a tongue formed on the second area 28 into an aperture formed on or near the second edge 24 of the heat shield 20. It should be appreciated that while a number of attaching means have been described herein, any means of attaching the second edge 24 to the second area 28 is intended to be within the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrated automotive vehicle isolation mount and heat shield apparatus, said apparatus comprising:

an isolation mount having a heat sensitive region; and a heat shield integrally molded onto said isolation mount;

said heat shield having a first edge bonded to a first area of said isolation mount during a molding process and a second edge attached to a second area of said isolation mount such that said heat shield substantially covers said heat sensitive region to limit exposure to radiant heat.

2. The apparatus of claim 1 wherein said heat shield is of generally uniform thickness.

3. The apparatus of claim 1 wherein said isolation mount includes a composite body formed of steel and rubber and said heat sensitive region is rubber.

4. The apparatus of claim 1 wherein said heat shield is molded of rubber.

5. The apparatus of claim 1 wherein said second edge of said heat shield is attached to said isolation mount with an adhesive.

6. The apparatus of claim 1 wherein a dimension between said first and second edges of said heat shield is greater than a dimension between first and second areas of said isolation mount that said heat shield arches across said heat sensitive region to reduce tension on the interfaces between said first and second edges and said isolation mount.

7. An integrated automotive vehicle isolation mount and heat shield apparatus, said apparatus comprising:

an isolation mount having a heat sensitive region; and a heat shield integrally molded onto said isolation mount;

said heat shield having a first edge bonded to a first area of said isolation mount during a molding process and a second edge attached to a second area of said isolation mount such that said heat shield substantially covers said heat sensitive region to limit exposure to radiant heat and arches across said heat sensitive region to reduce tension on the interfaces between said first and second edges and said isolation mount.

8. An integrated automotive vehicle isolation mount and heat shield apparatus, said apparatus comprising:

an isolation mount having a heat sensitive region; and a heat shield integrally molded onto said isolation mount;

said heat shield having a first edge bonded to a first area of said isolation mount during a molding process and a second edge attached to a second area of said isolation mount such that said heat shield substantially covers said heat sensitive region to limit exposure to radiant heat, wherein said first area of said isolation mount is opposite said heat sensitive region from said second area of said isolation mount.

* * * * *